US012732067B2

(12) United States Patent
Martin et al.

(10) Patent No.: US 12,732,067 B2
(45) Date of Patent: Sep. 8, 2026

(54) ELECTRIC MACHINE WITH INTEGRATED ELECTROMAGNETIC PUMPING SCHEME FOR DIRECT COOLED WINDINGS

(71) Applicant: GE Infrastructure Technology LLC, Greenville, SC (US)

(72) Inventors: Matthew R. Martin, Schenectady, NY (US); John R. Yagielski, Niskayuna, NY (US); Wei Zhang, Niskayuna, NY (US); Michael Mack, Schenectady, NY (US)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 175 days.

(21) Appl. No.: 18/592,078

(22) Filed: Feb. 29, 2024

(65) Prior Publication Data

US 2025/0279698 A1 Sep. 4, 2025

(51) Int. Cl.
*H02K 9/193* (2006.01)

(52) U.S. Cl.
CPC .................................... *H02K 9/193* (2013.01)

(58) Field of Classification Search
CPC .......... H02K 9/19; H02K 9/193; H02K 9/197; H02K 9/20; H02K 9/225; H02K 9/00; H02K 9/02; H02K 9/08; H02K 9/10
USPC ...................................................... 310/54, 52
See application file for complete search history.

(56) References Cited

U.S. PATENT DOCUMENTS 3,162,134 A * 12/1964 Lovell .................. F04B 17/046 417/418
4,182,650 A * 1/1980 Fischer .................... G21B 1/03 976/DIG. 3
11,050,421 B2 6/2021 Schlezinger
11,804,746 B2 10/2023 Bodla et al.
2004/0219026 A1* 11/2004 Peysakhovich ......... F04B 17/04 417/53
2005/0167075 A1* 8/2005 Eckert ..................... B22C 9/086 164/358
2009/0174279 A1 7/2009 Sheaffer et al.
2010/0252643 A1 10/2010 Hug et al.
2012/0249090 A1 10/2012 Sridharan et al.
2016/0359385 A1 12/2016 Buskirk et al.
2018/0062482 A1 3/2018 Giardino et al.
(Continued)

FOREIGN PATENT DOCUMENTS

EP 4 102 691 A1 6/2021
JP S5558769 A 5/1980
WO 2004018128 A2 3/2004

OTHER PUBLICATIONS

Extended European Search Report for EP 25155891.2, dated Jul. 9, 2025 (8 pp.).
(Continued)

*Primary Examiner* — Charles Reid, Jr.
(74) *Attorney, Agent, or Firm* — Eversheds Sutherland (US) LLP

(57) ABSTRACT

An integrated electric machine. The integrated electric machine includes a stator, a rotor positioned within the stator, and an electromagnetic pumping system in communication with the stator. The electromagnetic pumping system includes a conductive fluid and a number of electromagnetic pump windings to pump the conductive fluid through coolant pathways of direct cooled windings.

13 Claims, 3 Drawing Sheets

(56) References Cited

U.S. PATENT DOCUMENTS

| | | | | |
|---|---|---|---|---|
| 2022/0051820 | A1* | 2/2022 | Corbin | G21C 5/10 |
| 2022/0074633 | A1* | 3/2022 | Shu | F16N 29/02 |
| 2022/0251971 | A1 | 8/2022 | Pazinski et al. | |
| 2023/0336045 | A1 | 10/2023 | Martin et al. | |
| 2024/0047089 | A1* | 2/2024 | Shutayfi | G21C 1/02 |

OTHER PUBLICATIONS

Ruddy, Bryan Paul, et al., "Liquid conductor electric machines: a new cooling approach for pulsed power applications", 2021 IEEE Energy Conversion Congress and Exposition (ECCE), DOI:10.1109/ECCE47101.2021.9595149, 2021 (6 pp.).

* cited by examiner

ELECTRIC MACHINE WITH INTEGRATED ELECTROMAGNETIC PUMPING SCHEME FOR DIRECT COOLED WINDINGS

TECHNICAL FIELD

The present application and the resultant patent relate generally to electric machines such as motors and generators used in the production of electrical power and more particularly relate to an electric machine with an integrated electromagnetic pumping system to flow an electrically conductive fluid coolant therethrough.

BACKGROUND OF THE INVENTION

Generally described, electric machines such as motors, generators, and the like used in the production of electrical power may include a rotor with a wound coil or permanent magnets that serves as a source of magnetic flux. The rotor rotates within a fixed stator that may include a number of conductors in which an alternating current may be induced by the rotation therein. The overall power output of an electric machine may be limited due to the buildup of heat in the rotor components and/or the stator components. Such a buildup of heat may be reduced at least in part by the use of a flow of different types of coolants therethrough. Such coolants, however, generally require the use of separate pumps, blowers, and other types of devices that may impact the overall efficiency of the electric machine.

SUMMARY OF THE INVENTION

The present application and the resultant patent thus provide an integrated electric machine. The integrated electric machine includes a stator, a rotor positioned within the stator, and an electromagnetic pumping system in communication with the stator.

The present application and the resultant patent further may provide a method of cooling an integrated electric machine having a rotor and a stator. The method includes the steps of pumping a conductive fluid through direct cooled windings of the stator by a number of electromagnetic pump windings, absorbing heat in the conductive fluid from the direct cooled windings of the stator, pumping the conductive fluid to a heat exchanger, and cooling the conductive fluid in the heat exchanger. The cycle then may be repeated.

The present application and the resultant patent further may provide an integrated electric machine. The integrated electric machine may include a stator with a number of direct cooled windings, a rotor positioned within the stator, and an electromagnetic pumping system in communication with the direct cooled windings of the stator. The electromagnetic pumping system includes a conductive fluid flowing therethrough.

These and other features and improvements of the present application and the resultant patent may become apparent to one of ordinary skill in the art upon review of the following detailed description when taken in conjunction with the several drawings and the appended claims.

BRIEF DESCRIPTION

DETAILED DESCRIPTION

Figure 1:
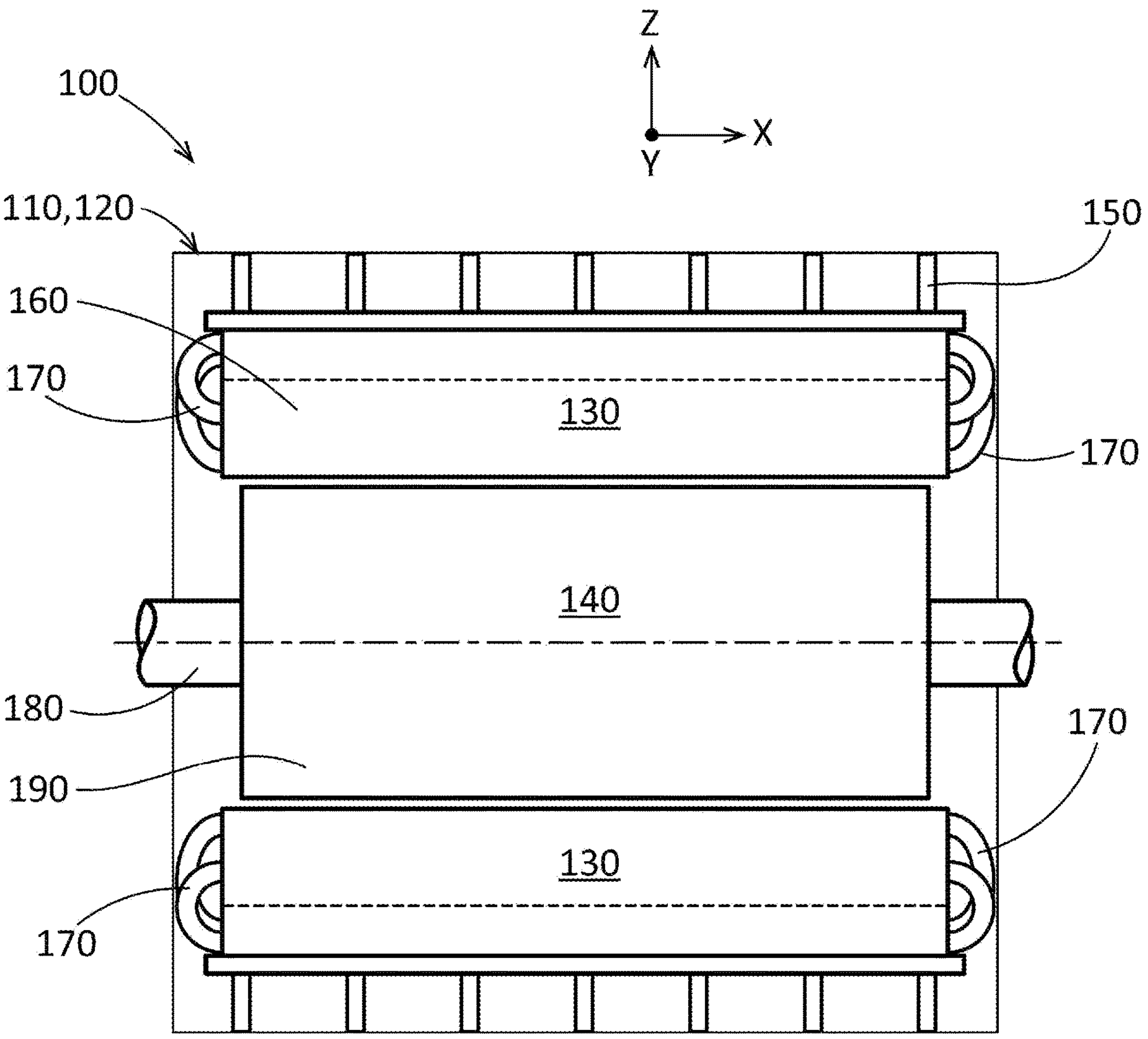
FIG. 1 is a schematic diagram of an electric machine with a stator and a rotor.

Referring now to the drawings, in which like numerals refer to like elements throughout the several views, FIG. 1 is a schematic diagram of an example of an electric machine 100. Generally described, the electric machine 100 may be a motor 110 or a generator 120. The electric machine 100 may include a stator 130 and a rotor 140. The stator 130 may include a stator frame 150 and a body 160 that may include conductive windings 170 about a magnetic core. (Alternatively, the rotor 140 could include a conductive winding about a magnetic core). The rotor 140 may include a shaft 180 having a rotational axis RA. The stator 130 is disposed around the rotor 140. The shaft 180 may be driven to rotate about the rotational axis RA by, for example, a gas turbine, a steam turbine, a wind turbine, a hydro turbine, an internal combustion engine, or any other suitable device configured to provide a rotational output. The shaft 180 is coupled to a substantially cylindrical body 190. The rotor 140 is disposed within the stator 130, which is configured to provide a stationary magnetic field. As described above, rotation of the rotor 140 within the stator 130 may generate electrical current in the conductive windings 170, thereby producing an electrical output from the electric machine 100. The electric machine described herein is for the purpose of example only. Many different components and configuration may be used.

Figure 2:
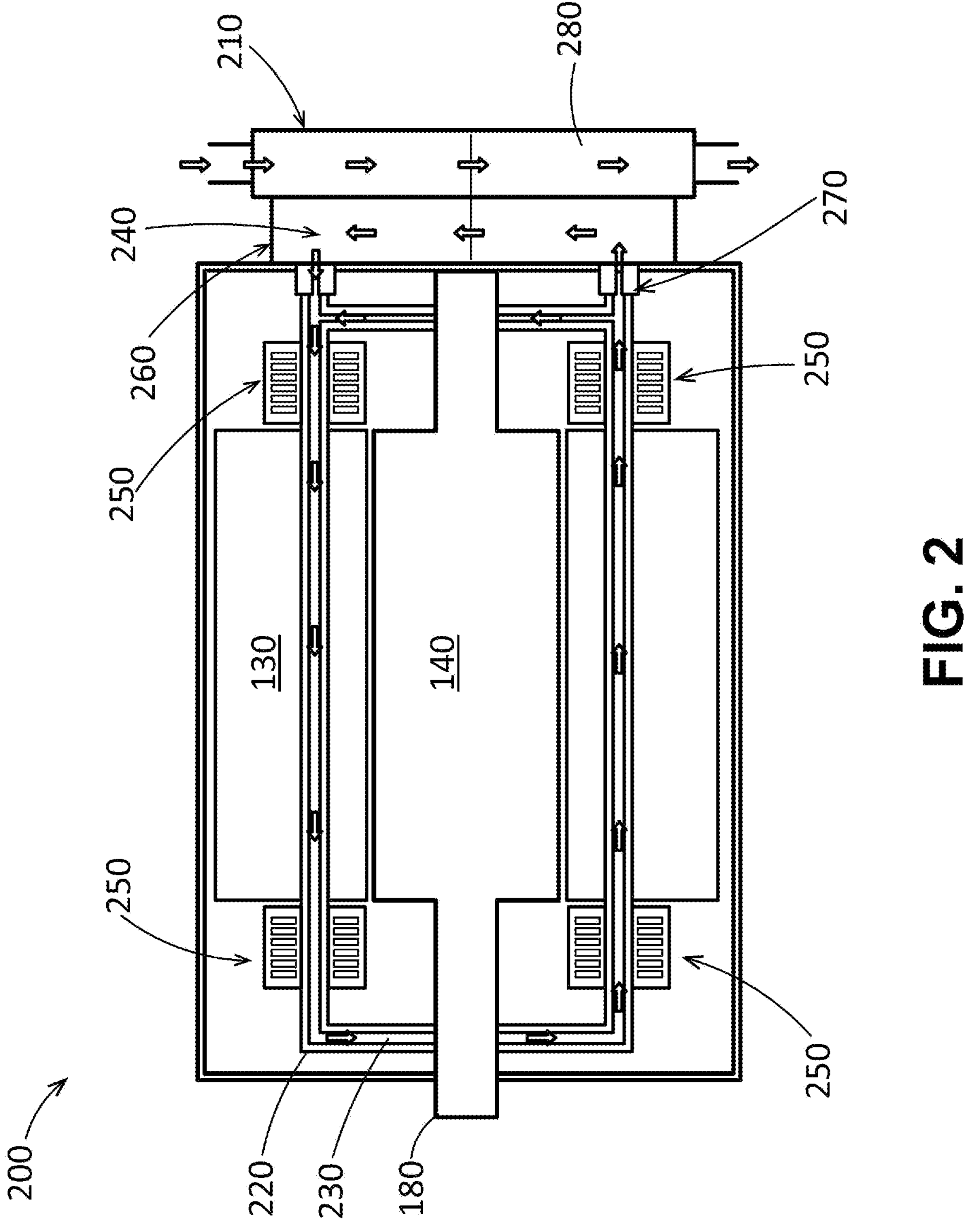
FIG. 2 is a schematic diagram of an exemplary integrated electric machine with an electromagnetic pumping system as may be described herein.
Figure 3:
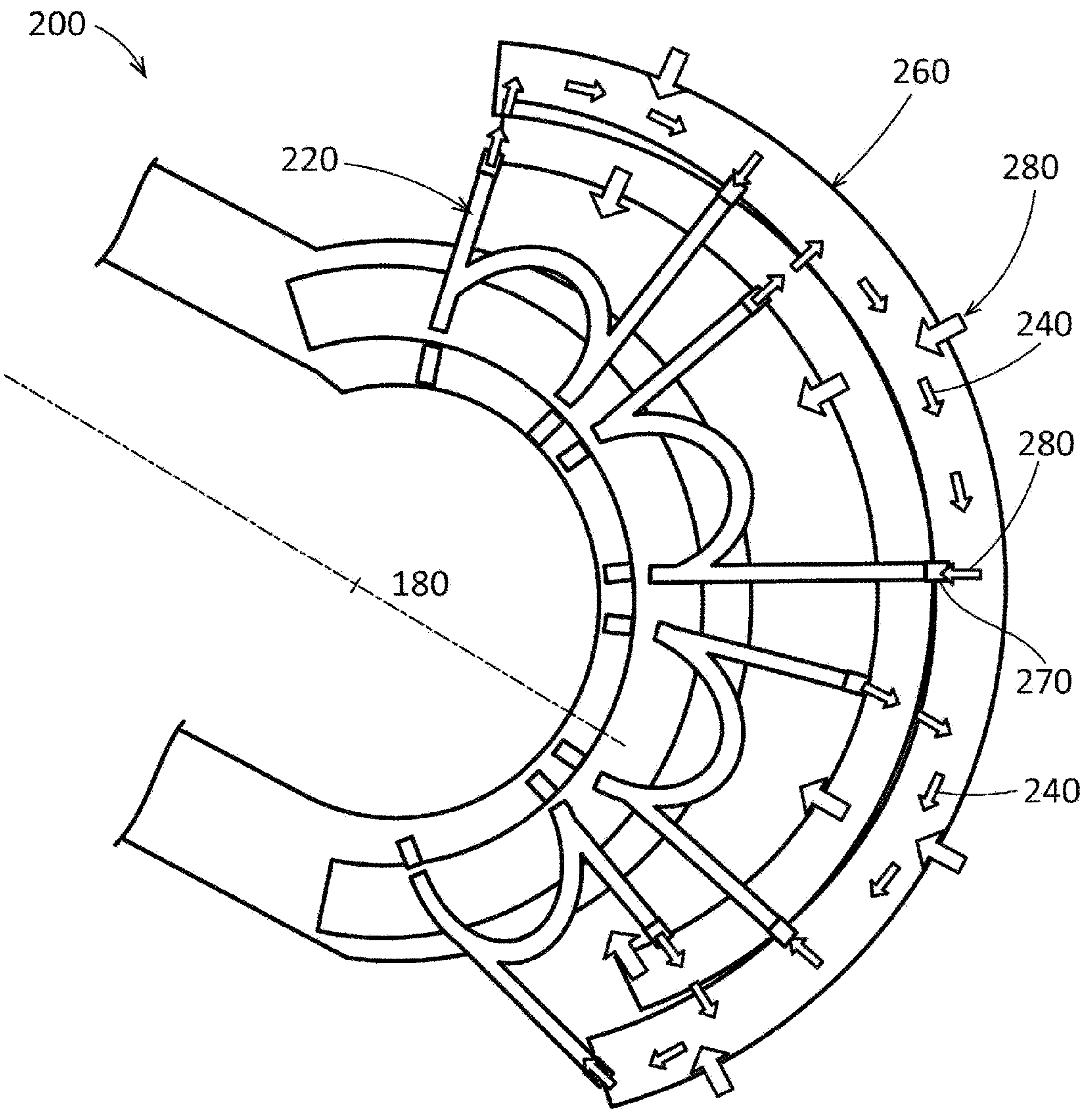
FIG. 3 is a further schematic diagram of the integrated electric machine with the electromagnetic pumping system of FIG. 2.

FIGS. 2 and 3 are schematic diagrams of an exemplary integrated electric machine 200 as may be described herein. The integrated electric machine 200 may include some of the components of the electric machine 100 described above, including the rotor 140 rotating within the stator 130 with the conductive windings 170. In this example, these components of the electric machine 100 are integrated with an electromagnetic pumping system 210. For example, the conductive windings 170 may be direct cooled windings 220 used with liquid cooling. The direct cooled windings 220 may have a coolant pathway 230 with a conductive fluid 240 flowing therein. Generally described, the conductive fluid 240 may be a metal powder filled fluid. Examples of conductive fluids include liquid sodium, sodium-potassium alloys, lithium, mercury, cesium, gallium, potassium, Field's metal (bismuth, indium, tin alloy), Rose's metal (bismuth, lead, tin alloy), Wood's metal (bismuth, lead, tin, cadmium alloy), Cerrosafe (bismuth, lead, tin, cadmium alloy), Cerrolow 136 (bismuth, lead, indium, tin alloy) and the like. Aluminum, aluminum alloys, and other metals also may be used. Molten salts and brine also may be electrically conductive. Higher conductivity suspensions may provide higher efficiency herein. Other types of conductive fluids 240 may be used. Certain embodiments also may have coolant pathways within the rotor 140.

The conductive fluid 240 may be pumped via a push and pull action through the direct cooled windings 220 by a number of electromagnetic pump windings 250 positioned about the stator 130. In an electromagnetic pump, a magnetic field is set at right angles to the direction in which the fluid moves while a current is passing therethrough. This causes an electromagnetic force that moves the fluid. Generally described, electromagnetic pumps may be classified into three categories: conduction pumps, induction pumps, and thermoelectric pumps. AC or DC conduction pumps conduct the current directly into the fluid through electrodes.

During the operation of an induction pump, the moving magnetic field induces a current within the conducting fluid. A thermoelectric pump extracts power from the thermal energy contained in a heated liquid metal flow in order to power the current. Advantageously, electromagnetic pumps have no moving parts or vibrations such that wear and tear generally is not an issue. Given such, overall maintenance therefore should be reduced.

The coolant pathways 230 of the direct cooled windings 220 may be in communication with a heat exchanger 260. Although a counter-flow configuration with a cooling flow 280 is shown herein, the heat exchanger 260 may be of conventional design with any type and direction of flow paths. The coolant pathways 230 and the heat exchanger 260 may have an electrical isolator 270 positioned therebetween due to the nature of the conductive fluid 240. The electrical isolators 270 may be of conventional design. Other components and other configurations may be used herein.

In use, the electromagnetic pumping system 210 circulates the conductive fluid 240 through the coolant pathways 230 to cool the direct cooled windings 220 of the stator 130 and then exchanges heat with the cooling flow 280 in the heat exchanger 260 before repeating the cycle. The integrated electric machine 200 thus combines the nonmoving aspects of the electromagnetic pump system 210 to circulate the conductive fluid 240 through the hollow coolant pathways 230 of the direct cooled windings 220. Specifically, the integrated electric machine 200 is the combination of the components of the electric machine 100 and the electromagnetic pump system 210.

The electromagnetic pump system 210 eliminates the need for a separate and traditional mechanical pump that would otherwise circulate the coolant into and out of the direct cooled winding, filters, heat exchangers, and the other components of the electric machine 100. The integrated electric machine 200 eliminates the rotating mechanical pumping components that are typically subject to standard maintenance cycles and may prematurely fail due to wear and other external factors. In addition, because the electromagnetic pump system 210 is integrated within the electric machine 100, the interface for the coolant to enter and exit the windings (and the housing) also is removed, thus limiting any chance for a loss-of-coolant accident (LOCA) or leak.

For applications where high power density may be required, the elimination of a mechanical pump, along with all the associated ancillary accessory parts (pipes, fittings, and the like) should be a major advantage with increased motor/generator power density. The electromagnetic pumping system 210 also may allow for more effective and efficient coolants to be used.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

Further aspects of the invention are provided by the subject matter of the following clauses:

1. An integrated electric machine, comprising: a stator; a rotor positioned within the stator; and an electromagnetic pumping system in communication with the stator.

2. The integrated electric machine of any preceding clause, wherein the stator comprises direct cooled windings.

3. The integrated electric machine of any preceding clause, wherein the direct cooled windings comprise coolant pathways therethrough.

4. The integrated electric machine of any preceding clause, wherein the electromagnetic pumping system comprises a conductive fluid.

5. The integrated electric machine of any preceding clause, wherein the conductive fluid flows through the coolant pathways of the direct cooled windings.

6. The integrated electric machine of any preceding clause, wherein the conductive fluid comprises liquid sodium, sodium-potassium alloys, or lithium.

7. The integrated electric machine of any preceding clause, wherein the conductive fluid comprises aluminum or aluminum alloys.

8. The integrated electric machine of any preceding clause, wherein the conductive fluid comprises molten salts or brine.

9. The integrated electric machine of any preceding clause, wherein the electromagnetic pumping system comprises a plurality of electromagnetic pump windings to pump the conductive fluid through the coolant pathways of the direct cooled windings.

10. The integrated electric machine of any preceding clause, wherein the electromagnetic pump windings operate via conduction, induction, or thermoelectric.

11. The integrated electric machine of any preceding clause, wherein the electromagnetic pumping system comprises a heat exchanger in communication with the coolant pathways of the direct cooled windings.

12. The integrated electric machine of any preceding clause, further comprising an electrical isolator positioned about the coolant pathways and the heat exchanger.

13. The integrated electric machine of any preceding clause, wherein the heat exchanger comprises a counter-flow heat exchanger with a cooling fluid.

14. The integrated electric machine of any preceding clause, wherein the integrated electric machine comprises a motor or a generator.

15. A method of cooling an integrated electric machine having a rotor and a stator, comprising: pumping a conductive fluid through direct cooled windings of the stator by a plurality of electromagnetic pump windings; absorbing heat in the conductive fluid from the direct cooled windings of the stator; pumping the conductive fluid to a heat exchanger; and cooling the conductive fluid in the heat exchanger.

16. An integrated electric machine, comprising: a stator with a plurality of direct cooled windings; a rotor positioned within the stator; and an electromagnetic pumping system in communication with the plurality of direct cooled windings of the stator; wherein the electromagnetic pumping system comprises a conductive fluid flowing therethrough.

17. The integrated electric machine of any preceding clause, wherein the direct cooled windings comprise coolant pathways therethrough.

18. The integrated electric machine of any preceding clause, wherein the electromagnetic pumping system comprises a plurality of electromagnetic pump windings to pump the conductive fluid through the direct cooled windings.

19. The integrated electric machine of any preceding clause, wherein the electromagnetic pumping system comprises a heat exchanger in communication with the coolant pathways of the direct cooled windings.

20. The integrated electric machine of any preceding clause, further comprising an electrical isolator positioned about the coolant pathways and the heat exchanger.

We claim:

1. An integrated electric machine, comprising:

a stator;

wherein the stator comprises direct cooled windings having hollow conductors with coolant pathways formed therein;

a rotor positioned within the stator; and an electromagnetic pumping system integrated within the stator and in direct communication with the hollow conductors of the direct cooled windings;

wherein the electromagnetic pumping system comprises a conductive fluid flowing through the coolant pathways within the hollow conductors of the direct cooled windings; and wherein the electromagnetic pumping system comprises a plurality of electromagnetic pump windings positioned about the stator to pump the conductive fluid.

2. The integrated electric machine of claim 1, wherein the conductive fluid comprises liquid sodium, sodium-potassium alloys, or lithium.

3. The integrated electric machine of claim 1, wherein the conductive fluid comprises aluminum alloys.

4. The integrated electric machine of claim 1, wherein the conductive fluid comprises molten salts or brine.

5. The integrated electric machine of claim 1, wherein the electromagnetic pump windings operate via conduction, induction, or thermoelectric.

6. The integrated electric machine of claim 1, wherein the electromagnetic pumping system comprises a heat exchanger in communication with the coolant pathways of the direct cooled windings.

7. The integrated electric machine of claim 6, further comprising an electrical isolator positioned about the coolant pathways and the heat exchanger.

8. The integrated electric machine of claim 6, wherein the heat exchanger comprises a counter-flow heat exchanger with a cooling fluid.

9. The integrated electric machine of claim 1, wherein the integrated electric machine comprises a motor or a generator.

10. A method of cooling an integrated electric machine having a rotor and a stator, comprising:

pumping a conductive fluid through coolant pathways formed within hollow conductors of direct cooled windings of the stator by a plurality of electromagnetic pump windings integrated within the stator;

absorbing heat in the conductive fluid from the direct cooled windings of the stator;

pumping the conductive fluid to a heat exchanger; and cooling the conductive fluid in the heat exchanger.

11. An integrated electric machine, comprising:

a stator with a plurality of direct cooled windings having hollow conductors with coolant pathways formed therethrough;

a rotor positioned within the stator; and an electromagnetic pumping system integrated within the stator and in direct communication with the plurality of direct cooled windings of the stator;

wherein the electromagnetic pumping system comprises a conductive fluid flowing through the coolant pathways within the hollow conductors of the direct cooled windings;

wherein the electromagnetic pumping system comprises a plurality of electromagnetic pump windings positioned about the stator to pump the conductive fluid through the direct cooled windings.

12. The integrated electric machine of claim 11, wherein the electromagnetic pumping system comprises a heat exchanger in communication with the coolant pathways of the direct cooled windings.

13. The integrated electric machine of claim 12, further comprising an electrical isolator positioned about the coolant pathways and the heat exchanger.

* * * * *